United States Patent
Niemi et al.

(10) Patent No.: US 11,147,116 B2
(45) Date of Patent: Oct. 12, 2021

(54) APPARATUSES AND METHODS FOR HANDLING A NON-INTEGRITY-PROTECTED REJECT MESSAGE

(71) Applicant: MediaTek Singapore Pte. Ltd., Singapore (SG)

(72) Inventors: Marko Niemi, Oulu (FI); Jarkko Eskelinen, Oulu (FI); Matti Moisanen, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 45 days.

(21) Appl. No.: 16/801,499

(22) Filed: Feb. 26, 2020

(65) Prior Publication Data

US 2020/0275506 A1     Aug. 27, 2020

Related U.S. Application Data

(60) Provisional application No. 62/810,428, filed on Feb. 26, 2019.

(51) Int. Cl.
*H04W 76/18*     (2018.01)
*H04W 60/00*     (2009.01)
(Continued)

(52) U.S. Cl.
CPC ............. *H04W 76/18* (2018.02); *H04W 8/12* (2013.01); *H04W 8/24* (2013.01); *H04W 60/00* (2013.01); *H04W 76/11* (2018.02); *H04W 84/042* (2013.01)

(58) Field of Classification Search
CPC ....... H04W 76/18; H04W 60/00; H04W 8/24; H04W 76/11; H04W 8/12; H04W 84/042; H04W 48/16; H04W 88/06; H04W 60/04
See application file for complete search history.

(56) References Cited

U.S. PATENT DOCUMENTS

| | | | |
|---|---|---|---|
| 10,645,746 B2 | 5/2020 | Faccin et al. | |
| 10,716,169 B2 | 7/2020 | Vesely et al. | |

(Continued)

FOREIGN PATENT DOCUMENTS

| | | |
|---|---|---|
| TW | 201836430 A | 10/2018 |
| TW | 201841545 A | 11/2018 |

(Continued)

OTHER PUBLICATIONS

International Search Report and Written Opinion dated May 27, 2020, issued in application No. PCT/CN2020/076795.

(Continued)

*Primary Examiner* — Marisol Figueroa
(74) *Attorney, Agent, or Firm* — McClure, Qualey & Rodack, LLP

(57) ABSTRACT

A User Equipment (UE) communicates with one or both of a first 3GPP core network and a second 3GPP core network over one or both of a 3GPP access and a non-3GPP access. The communication includes: receiving, from the first 3GPP core network, a reject message; and searching for another suitable cell or another suitable Access Point (AP), when the reject message is received over the 3GPP access or the non-3GPP access and the UE is registered with the first 3GPP core network or the second 3GPP core network over the 3GPP access or the non-3GPP access.

20 Claims, 14 Drawing Sheets

(51) Int. Cl.
  *H04W 8/24*   (2009.01)
  *H04W 76/11*  (2018.01)
  *H04W 8/12*   (2009.01)
  *H04W 84/04*  (2009.01)

(56) References Cited

U.S. PATENT DOCUMENTS

2016/0255674 A1* 9/2016 Niemi ............... H04W 60/04
                                                  455/435.1
2021/0084069 A1* 3/2021 Kumar ............... H04W 48/08

FOREIGN PATENT DOCUMENTS

WO   2012/130133 A1   10/2012
WO   2017/189139 A1   11/2017

OTHER PUBLICATIONS

"Allow UEs to proceed with CSFB after TAU Reject #9,#10 or #40;" 3GPP TSG-CT WG1 Meeting #92; May 2015; pp. 1-8.
"Further corrections of handling of NAS reject messages without integrity protection;" 3GPP TSG-CT WG1 Meeting #102; Feb. 2017; pp. 1-5.
Chinese language office action dated Mar. 10, 2021, issued in application No. TW 109106258.

* cited by examiner

APPARATUSES AND METHODS FOR HANDLING A NON-INTEGRITY-PROTECTED REJECT MESSAGE

CROSS REFERENCE TO RELATED APPLICATIONS

This Application claims priority of U.S. Provisional Application No. 62/810,428, filed on Feb. 26, 2019, the entirety of which is incorporated by reference herein.

BACKGROUND OF THE APPLICATION

Field of the Application

The application generally relates to mobile communications, and more particularly, to apparatuses and methods for handling a non-integrity-protected reject message.

Description of the Related Art

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals with one or more service networks. The wireless communications between the UE and the service networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

According to the 3GPP specifications and/or requirements in compliance with the 5G NR technology, a UE may access a 5G System (5GS) over 3GPP access or non-3GPP access. However, there may be situations where a UE receives a non-integrity-protected reject message from a 5GS over one access (e.g., 3GPP access) while it's registered with the 5GS over another access (e.g., non-3GPP access). The current 3GPP specifications and/or requirements in compliance with the 5G NR technology do not define specific UE behaviors regarding how to handle the non-integrity-protected reject message in such circumstances, and thus, indeterminate behavior or even operation error may occur in UEs.

BRIEF SUMMARY OF THE APPLICATION

In order to solve the aforementioned problem, the present application proposes specific ways for a UE to handle a non-integrity-protected reject message received over one access while it's registered with the same or different 3GPP core network over the same or another access.

In one aspect of the application, a UE comprising a wireless transceiver and a controller is provided. The wireless transceiver is configured to obtain one or both of a 3GPP access and a non-3GPP access. The controller is configured to communicate with one or both of a first 3GPP core network and a second 3GPP core network over one or both of the 3GPP access and the non-3GPP access via the wireless transceiver, wherein the communication with one or both of the first 3GPP core network and the second 3GPP core network comprises: receiving, from the first 3GPP core network, a reject message without integrity protection; and searching for another suitable cell or another suitable Access Point (AP), when the reject message is received over the 3GPP access or the non-3GPP access and the UE is registered with the first 3GPP core network or the second 3GPP core network over the 3GPP access or the non-3GPP access.

In another aspect of the application, a method for handling a non-integrity-protected reject message, executed by a UE communicatively connected to one or both of a first 3GPP core network and a second 3GPP core network over one or both of a 3GPP access and a non-3GPP access, is provided. The method comprises the steps of: receiving, from the first 3GPP core network, a reject message without integrity protection; and searching for another suitable cell or another suitable AP, when the reject message is received over the 3GPP access or the non-3GPP access and the UE is registered with the first 3GPP core network or the second 3GPP core network over the 3GPP access or the non-3GPP access.

Other aspects and features of the present application will become apparent to those with ordinarily skill in the art upon review of the following descriptions of specific embodiments of the UEs and methods method for handling a non-integrity-protected reject message.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
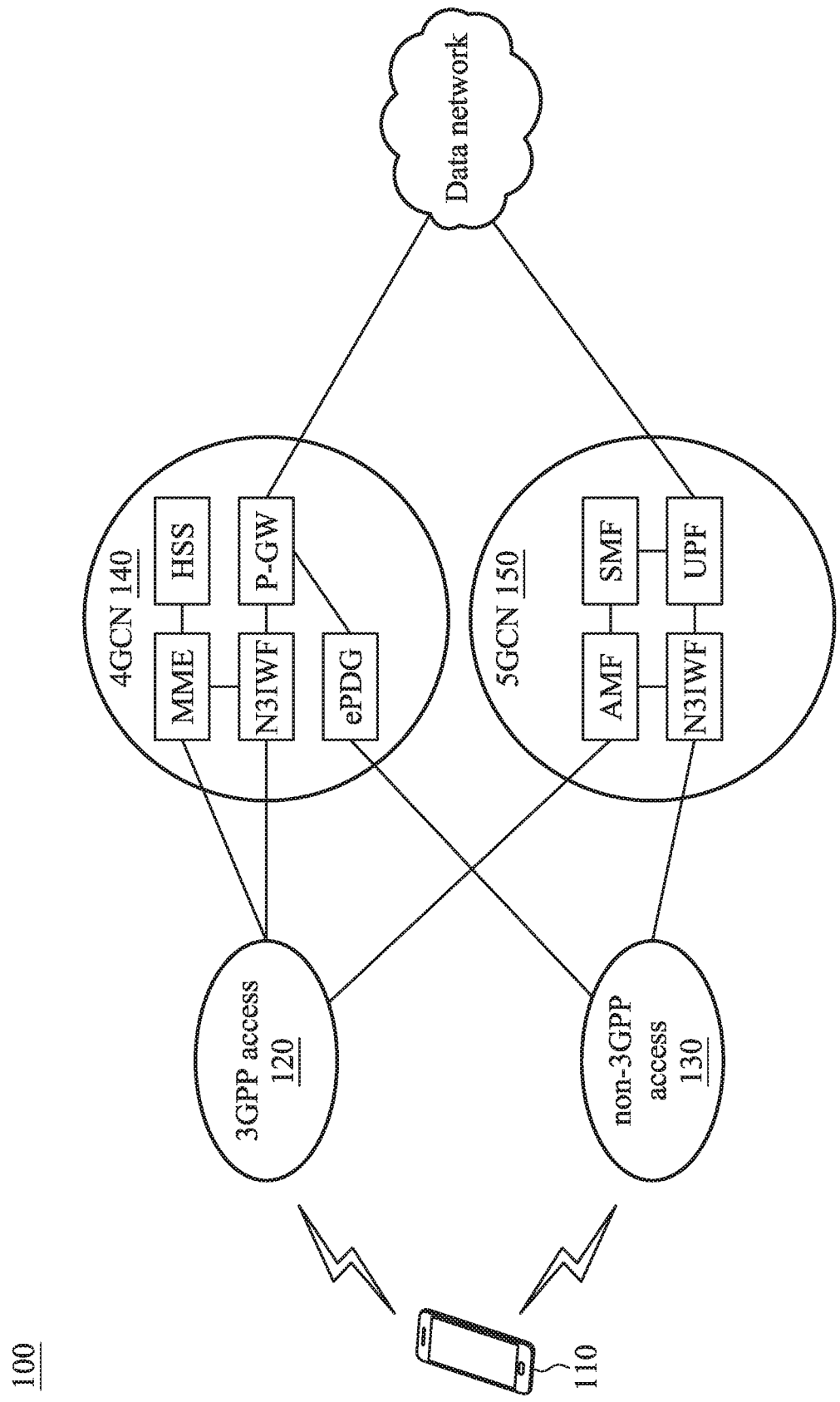
FIG. 1 is a block diagram of a wireless communication environment according to an embodiment of the application.

FIG. 1 is a block diagram of a wireless communication environment according to an embodiment of the application.

The wireless communication environment 100 includes a UE 110, a 3GPP access 120, a non-3GPP access 130, and two 3GPP core networks which are exemplified by a 4G Core Network (4GCN) 140 and a 5G Core Network (5GCN) 150.

The UE 110 may be a feature phone, a smartphone, a tablet PC, a laptop computer, or any wireless communication device supporting the RATs utilized by the 3GPP access 120, the non-3GPP access 130, the 4GCN 140, and the 5GCN 150.

The UE 110 may be wirelessly connected to one or both of the 4GCN 140 and the 5GCN 140 via the 3GPP access 120 and/or the non-3GPP access 130. For example, the UE 110 may communicate with the 4GCN 140 over the 3GPP access 120 and/or the non-3GPP access 130, to obtain mobile services therefrom. Likewise, the UE 110 may communicate with the 5GCN 150 over the 3GPP access 120 and/or the non-3GPP access 130, to obtain mobile services therefrom.

The 3GPP access 120 may refer to an access network utilizing one of the RATs specified by 3GPP. For example, the 3GPP access 120 may include a GSM EDGE Radio Access Network (GERAN), Universal Terrestrial Radio Access Network (UTRAN), Evolved UTRAN (E-UTRAN), or Next Generation Radio Access Network (NG-RAN).

In one embodiment, the 3GPP access 120 may include a GERAN which includes at least a Base Transceiver Station (BTS) and a Base Station Controller (BSC)

In one embodiment, the 3GPP access 120 may include a UTRAN which includes at least one NodeB (NB).

In one embodiment, the 3GPP access 120 may include an E-UTRAN which includes at least one evolved NodeB (eNB) (e.g., macro eNB, femto eNB, or pico eNB).

In one embodiment, the 3GPP access 120 may include an NG-RAN which includes one or more gNBs, and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

The non-3GPP access 130 may refer to an access network utilizing one RAT not specified by 3GPP. For example, the non-3GPP access 130 may include a Wireless-Fidelity (Wi-Fi) network, a WiMAX network, a CDMA network, or a fixed network (e.g., a Digital Subscriber Line (DSL) network).

Each of the 3GPP access 120 and the non-3GPP access 130 is capable of providing the functions of processing radio signals, terminating radio protocols, and connecting the UE 110 with the 4GCN 140 or the 5GCN 150, while each of the 4GCN 140 and the 5GCN 140 is responsible for performing mobility management, network-side authentication, and interfaces with a public/external data network (e.g., the Internet).

The 4GCN 140 may also be called an Evolved Packet Core (EPC) in the LTE-based technology, and it may include at least a Home Subscriber Server (HSS), a Mobility Management Entity (MME), a Serving Gateway (S-GW), a Packet Data Network Gateway (PDN-GW or P-GW), and an evolved Packet Data Gateway (ePDG).

The HSS is a central database that contains user-related and subscription-related information. The functions of the HSS include functionalities such as mobility management, call and session establishment support, user authentication and access authorization.

The MME is responsible for idle mode UE paging and tagging procedures including retransmissions. It is involved in the bearer activation/deactivation process and is also responsible for choosing the S-GW for the UE 110 at the initial attach and at time of intra-LTE handover involving Core Network (CN) node relocation. It is also responsible for user authentication (by interacting with the HSS) and generation/allocation of temporary identities to the UE 110. It is also the termination point in the network for ciphering/integrity protection for Non Access Stratum (NAS) signaling and handles the security key management.

The S-GW is responsible for routing and forwarding user data packets, while it also acting as the mobility anchor for the user plane during inter-eNB handovers and as the anchor for mobility between LTE and other 3GPP technologies The P-GW provides connectivity from the UE 110 to external PDNs by being the point of exit and entry of traffic for the UE 110. The PGW also provides the functions of policy enforcement, packet filtering for each user, charging support, lawful interception, and packet screening.

The ePDG enables secure connection between the UE 110 and the 4GCN 140 over untrusted non-3GPP access (e.g. the non-3GPP access 130).

The 5GCN 150 may also be called a Next Generation Core Network (NG-CN) in the 5G NR technology, and it may support various network functions, including an AMF, a Session Management Function (SMF), a User Plane Function (UPF), a Policy Control Function (PCF), an Application Function (AF), an Authentication Server Function (AUSF), and a Non-3GPP Inter-Working Function (N3IWF), wherein each network function may be implemented as a network element on dedicated hardware, or as a software instance running on dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs. The N3IWF may enable the UE 110 to attach to the 5GCN 150 either via trusted non-3GPP access or via untrusted non-3GPP access.

It should be understood that the 4GCN 140 and 5GCN 150 depicted in FIG. 1 are for illustrative purposes only and are not intended to limit the scope of the application. For example, the UE 110 may be wirelessly connected to other 3GPP core networks (e.g., 2GCN/3GCN or future evolution of the 5GCN, such as 6GCN, and 7GCN, etc.) over the 3GPP access 120 and/or the non-3GPP access 130.

Figure 2:
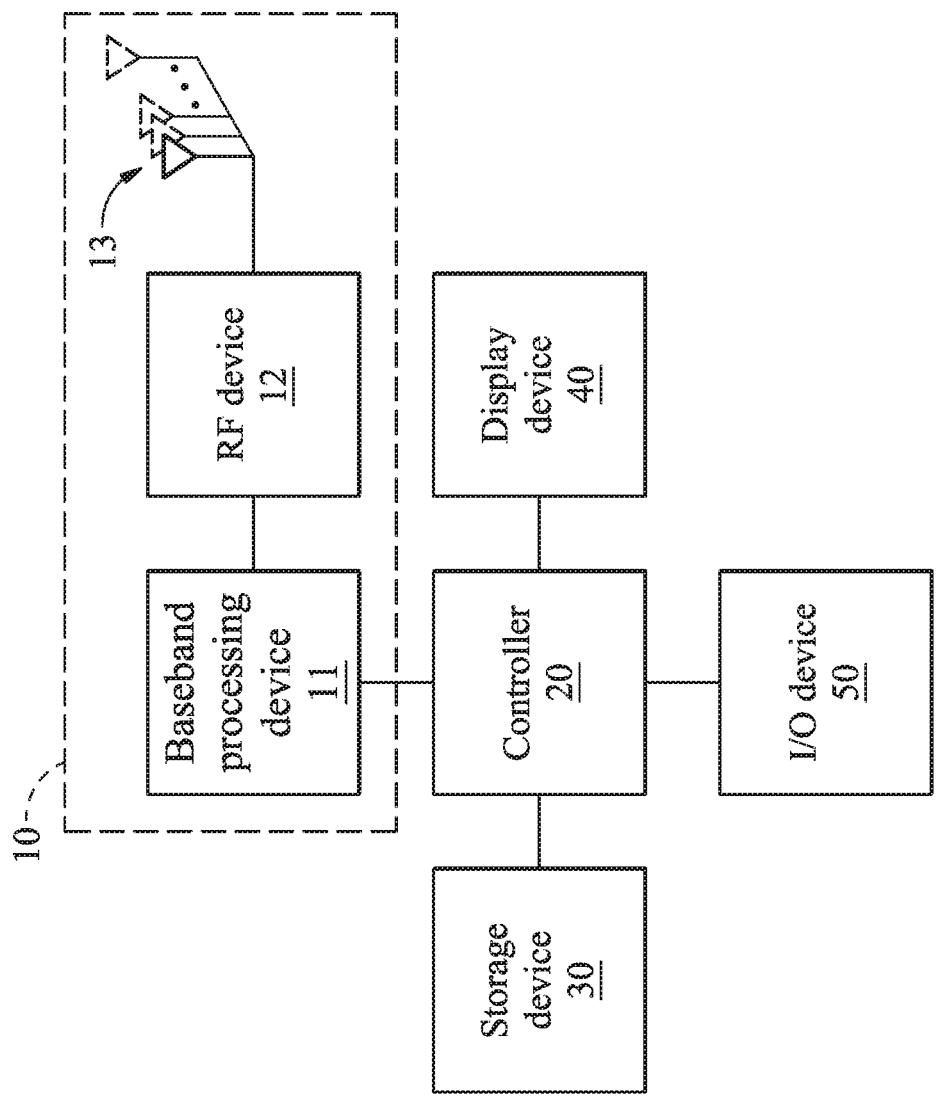
FIG. 2 is a block diagram illustrating the UE 110 according to an embodiment of the application.
Figure 3A:
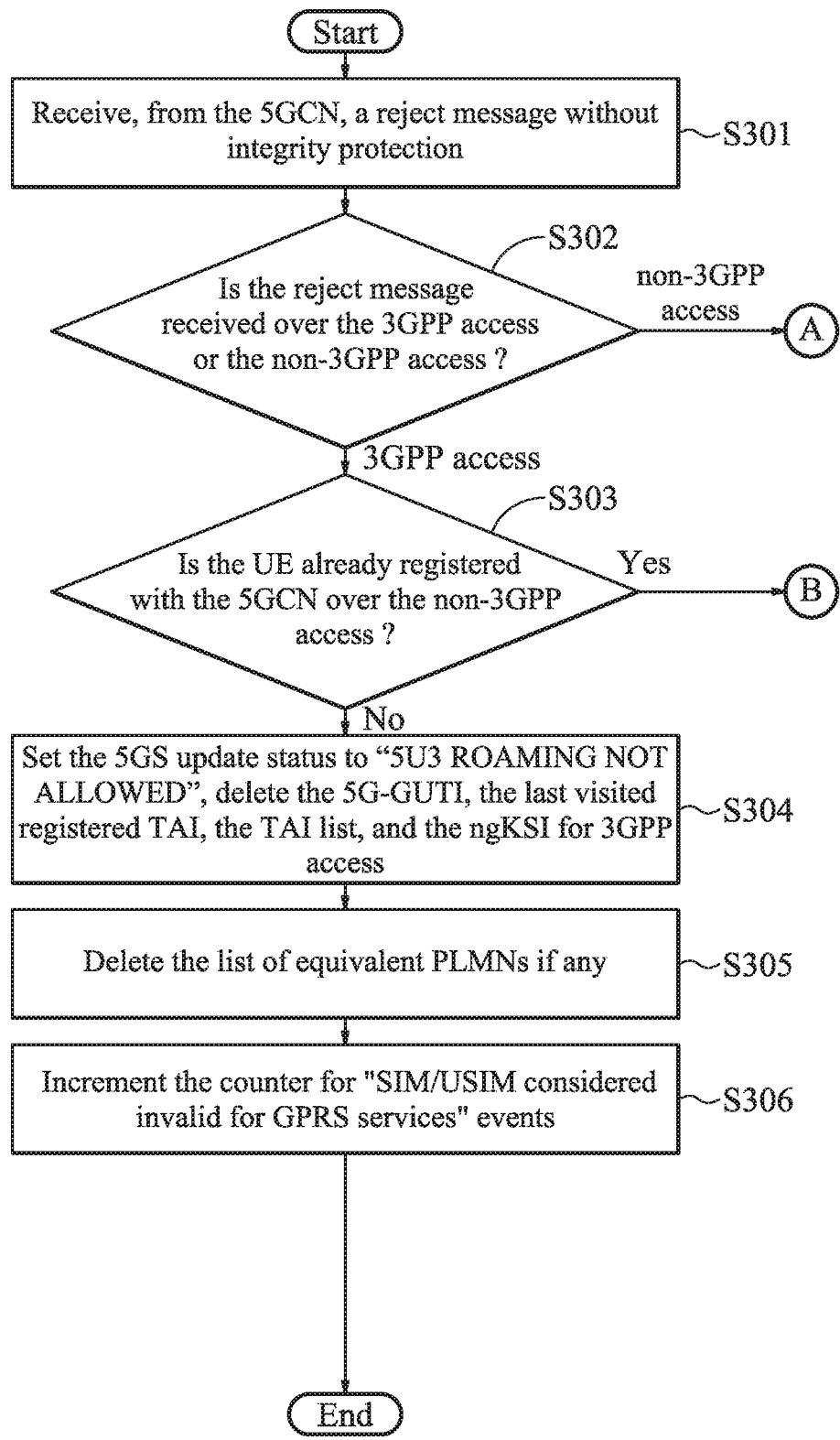
FIGS. 3A~3D show a flow chart illustrating the method for handling a non-integrity-protected reject message according to an embodiment of the application.
Figure 3B:
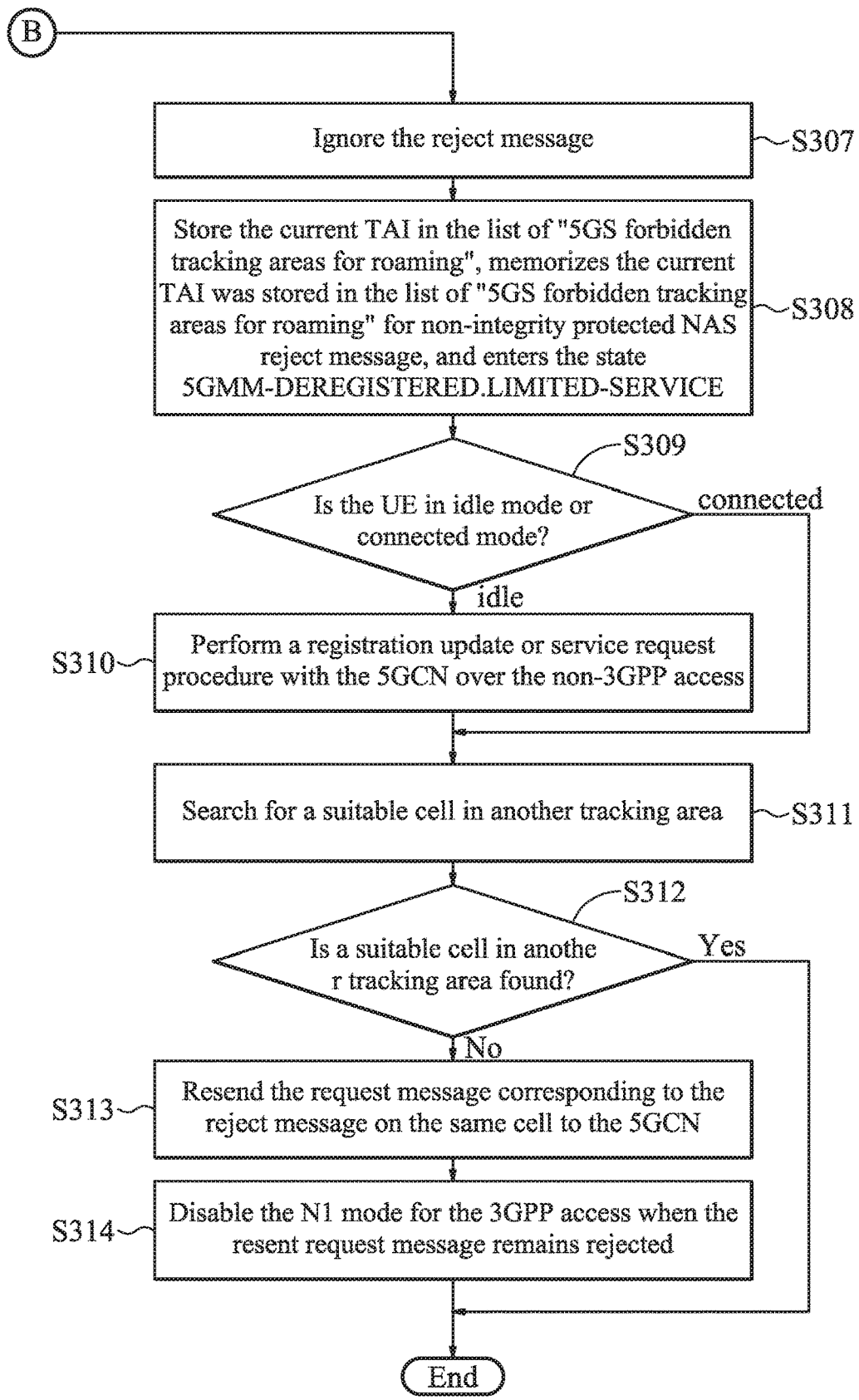
Figure 3C:
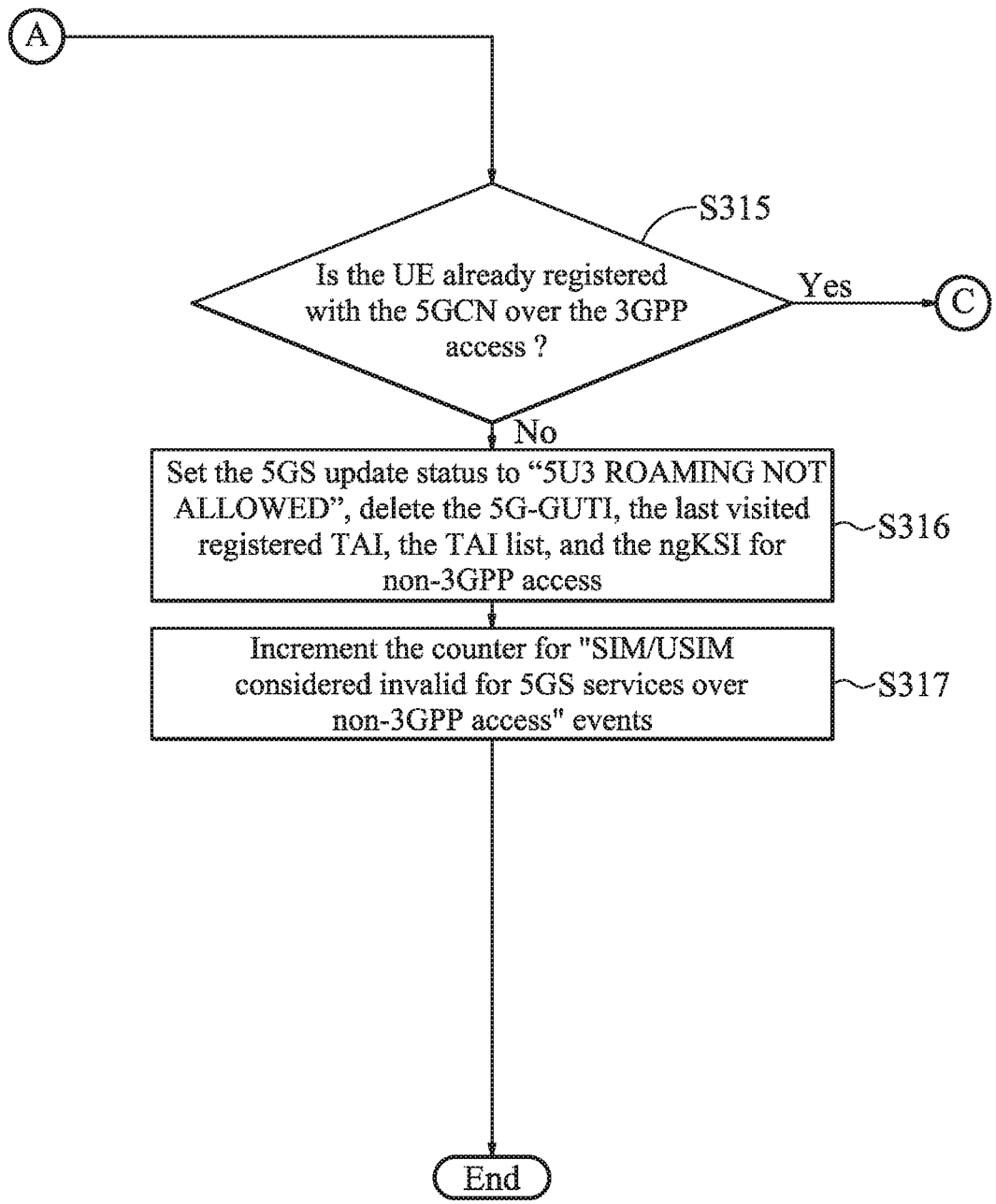
Figure 3D:
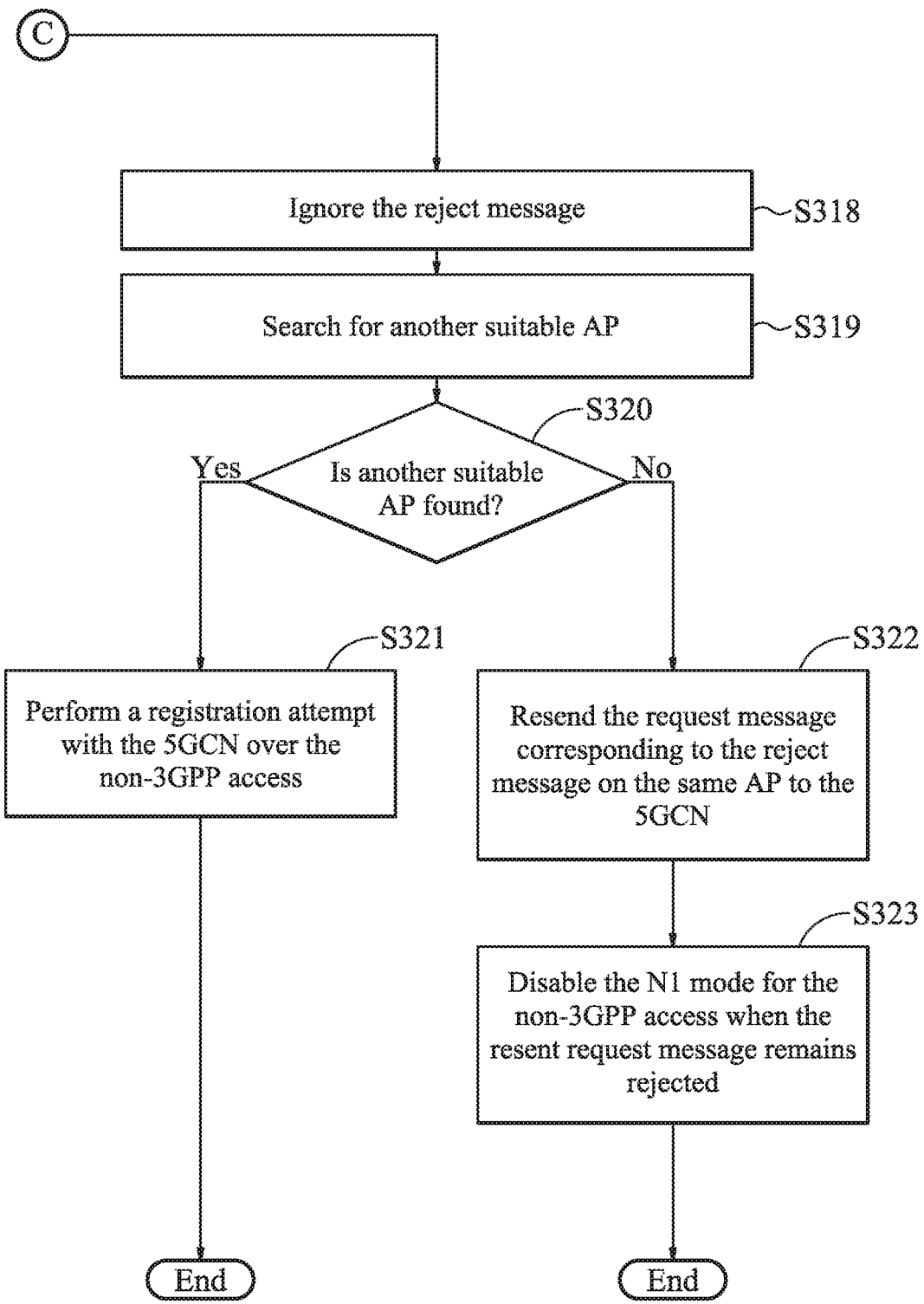
Figure 4A:
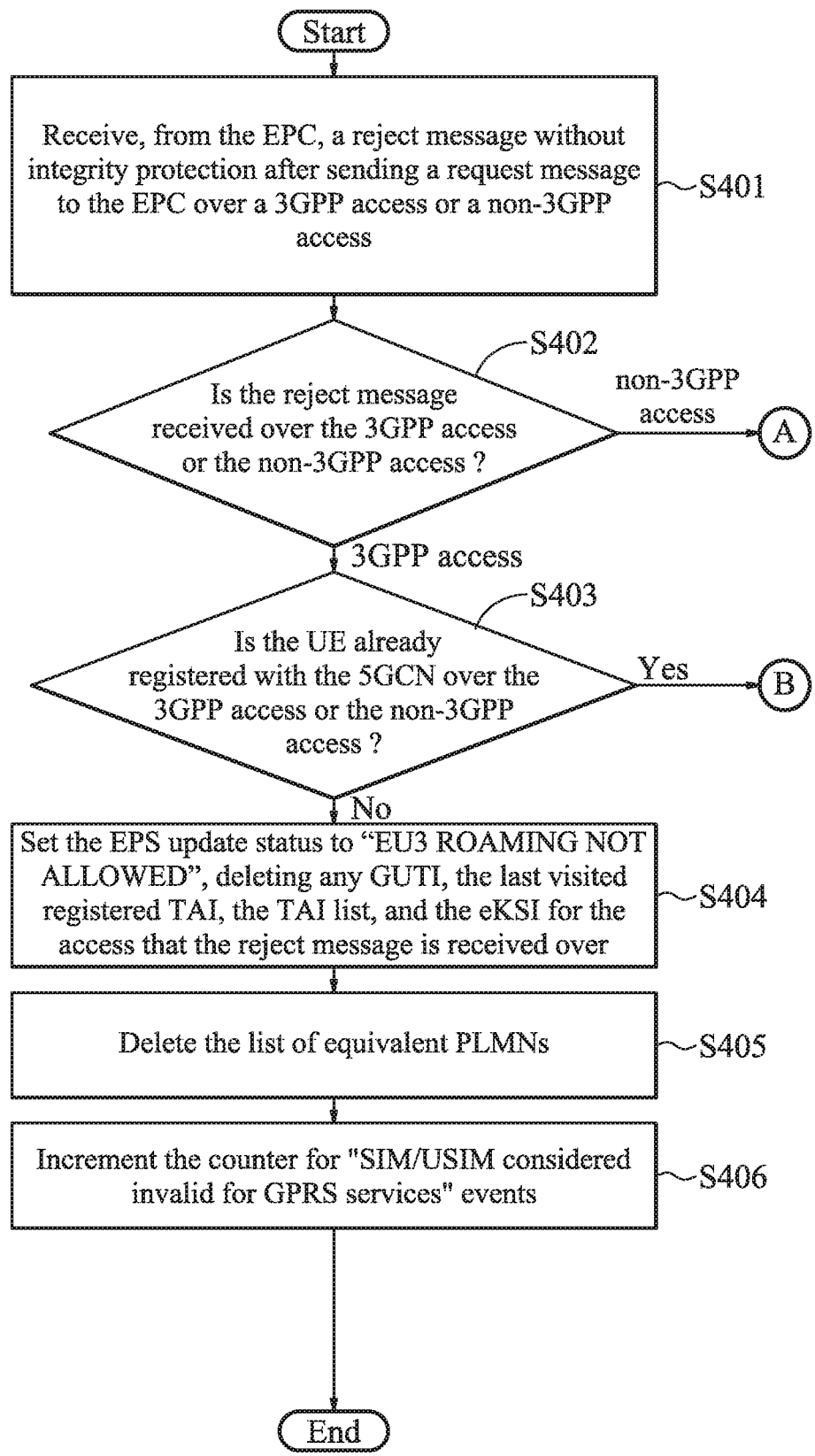
FIGS. 4A~4D show a flow chart illustrating the method for handling a non-integrity-protected reject message according to another embodiment of the application and FIGS. 5A~5D show a flow chart illustrating the method for handling a non-integrity-protected reject message according to another embodiment of the application.
Figure 4B:
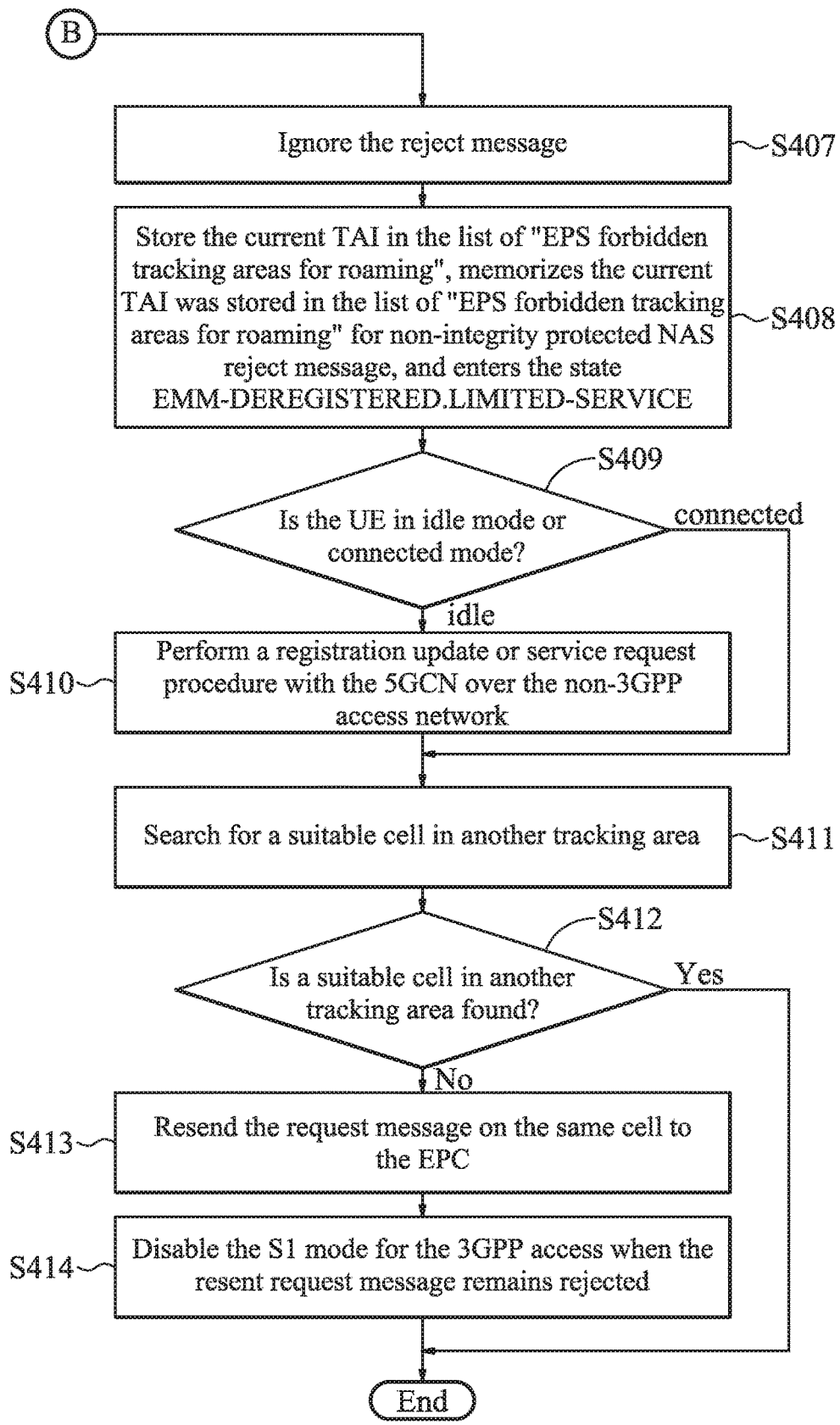
Figure 4C:
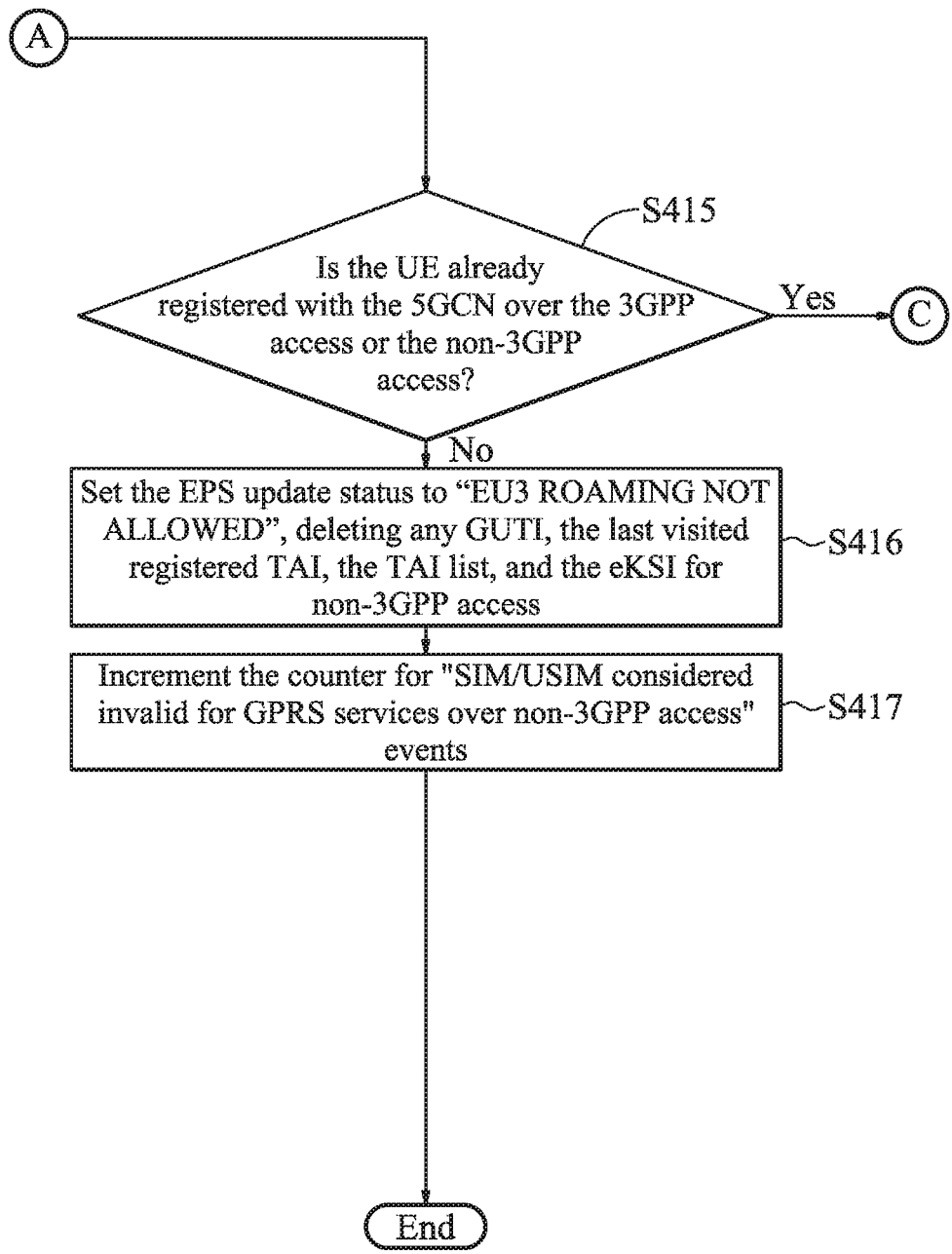
Figure 4D:
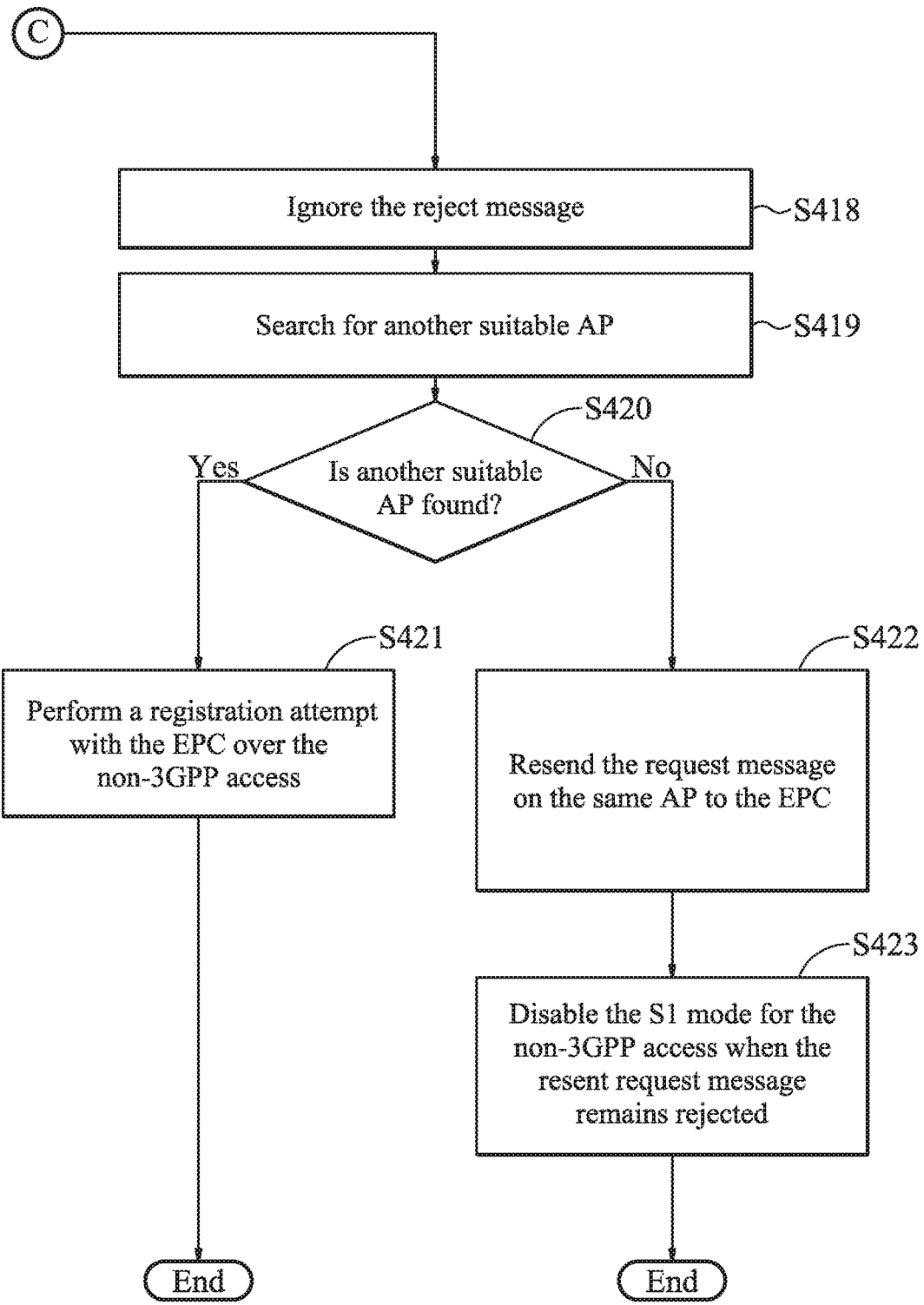
Figure 5A:
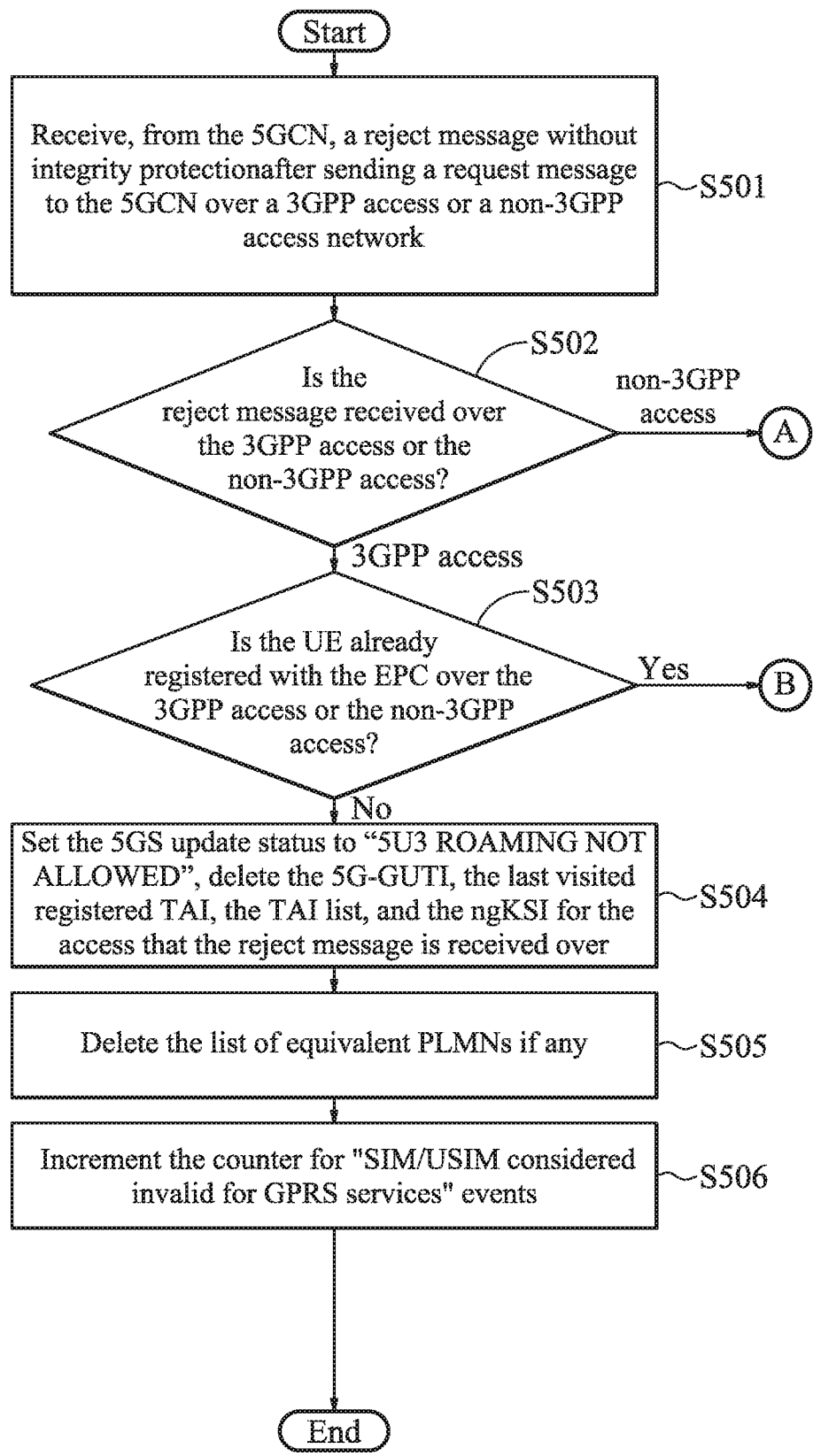
Figure 5B:
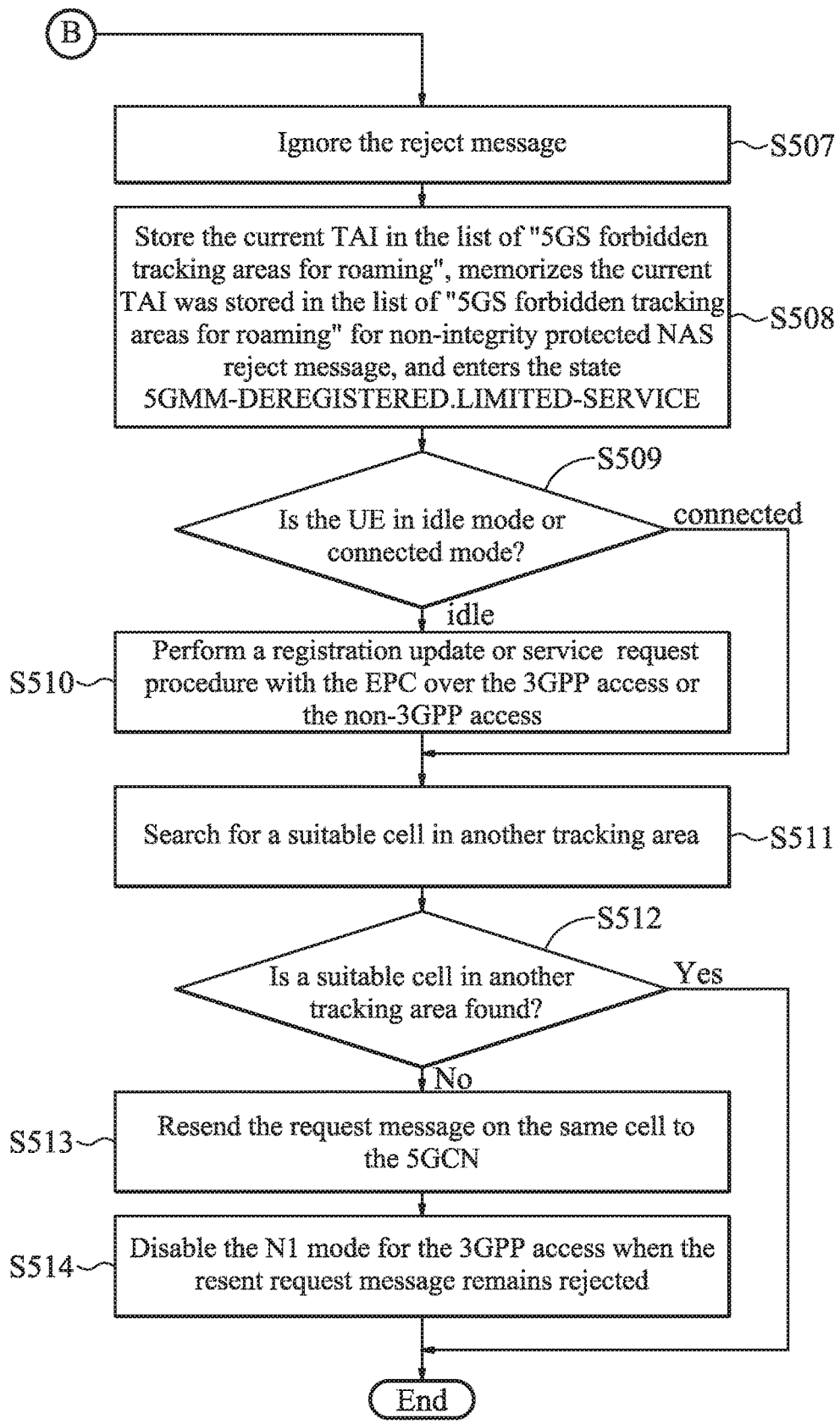
Figure 5C:
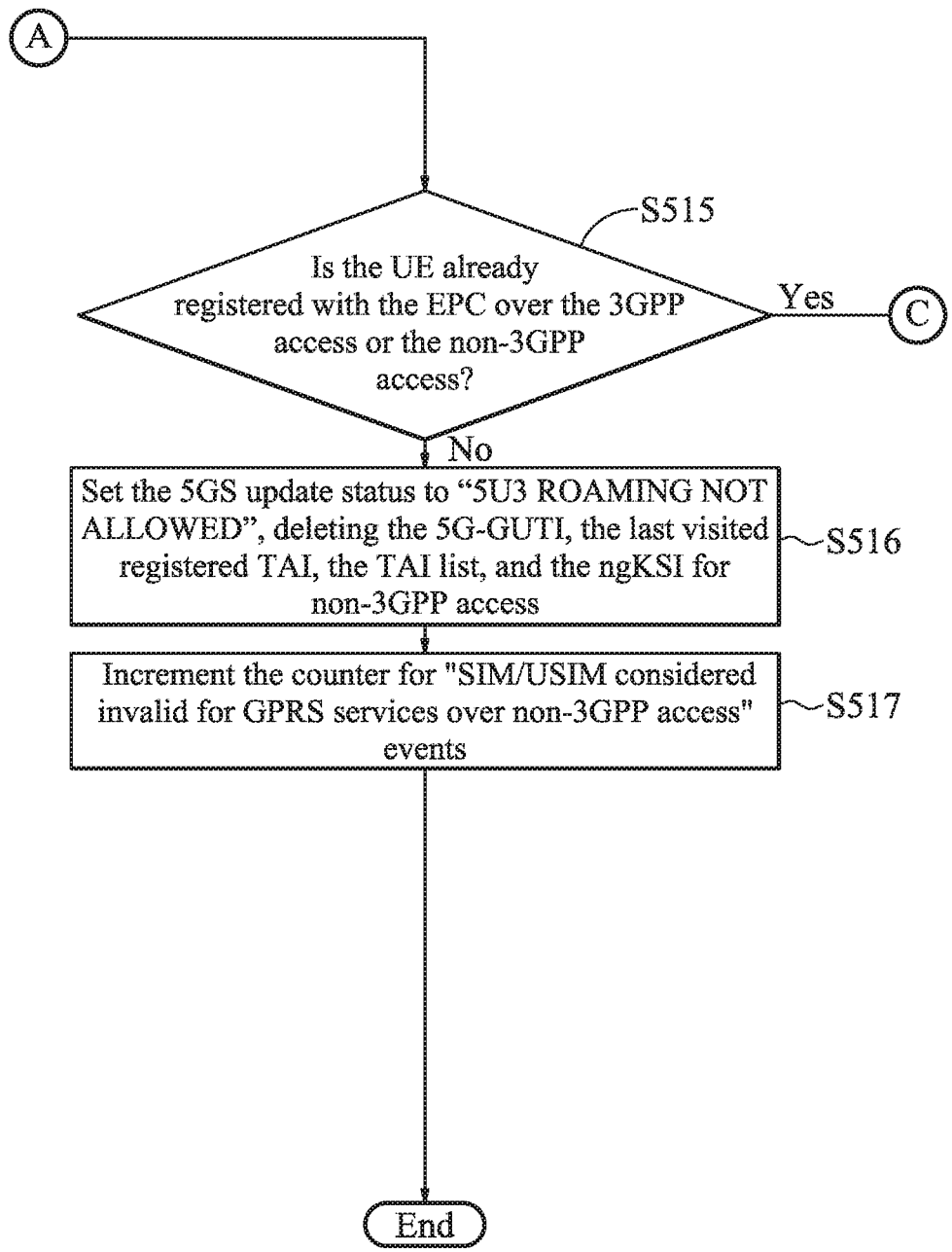
Figure 5D:
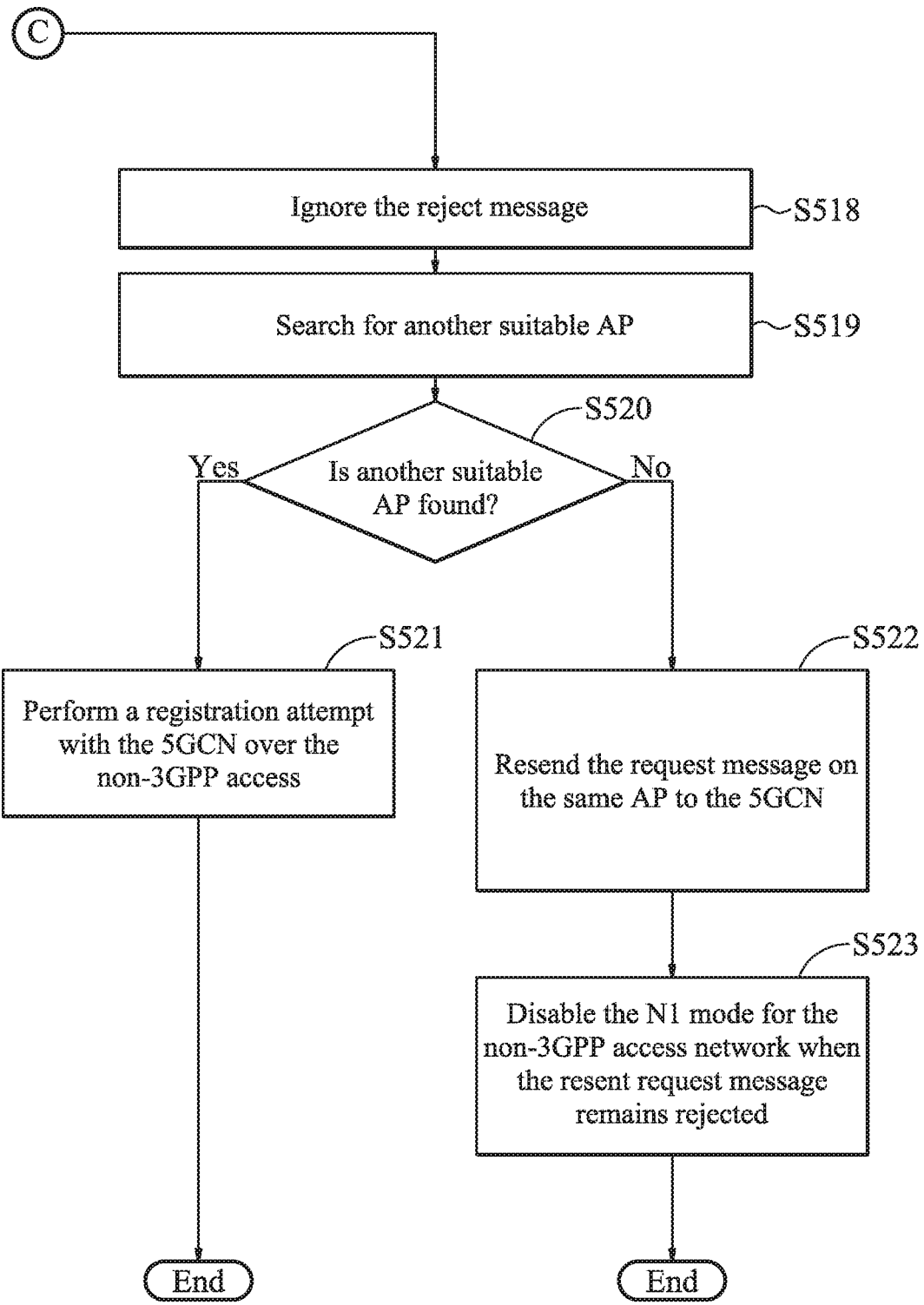

FIG. 2 is a block diagram illustrating the UE 110 according to an embodiment of the application.

The UE 110 includes a wireless transceiver 10, a controller 20, a storage device 30, a display device 40, and an Input/Output (I/O) device 50.

The wireless transceiver 10 is configured to perform wireless transmission and reception to obtain a 3GPP access (e.g., the 3GPP access 120) and/or a non-3GPP access (e.g., the non-3GPP access 130). Specifically, the wireless transceiver 10 includes a baseband processing device 11, a Radio Frequency (RF) device 12, and antenna(s) 13, wherein the antenna(s) 13 may include one or more antennas for beamforming. The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 12 may receive RF wireless signals via the antenna(s) 13, convert the received RF wireless signals to baseband signals, which are processed by the baseband processing device 11, or receive baseband signals from the baseband processing device 11 and convert the received baseband signals to RF wireless signals, which are later transmitted via the antenna(s) 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 900 MHz, 1800 MHz or 1900 MHz utilized in 2G (e.g., GSM/EDGE/GPRS) systems, or 900 MHz, 1900 MHz or 2100 MHz utilized in 3G (e.g., WCDMA) systems, or 900 MHz, 2100 MHz, or 2.6 GHz utilized in 4G (e.g., LTE/LTE-A/TD-LTE) systems, or any radio frequency (e.g., 30 GHz-300 GHz for mmWave) utilized in 5G (e.g., NR) systems, or another radio frequency, depending on the RAT in use.

In another embodiment, the wireless transceiver 10 may include multiple sets of a baseband processing device, an RF device, and an antenna, wherein each set of a baseband processing device, an RF device, and an antenna is configured to perform wireless transmission and reception using a respective RAT.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for obtaining one or both of a 3GPP access and a non-3GPP access, enabling the storage device 30 and storing and retrieving data (e.g., access type restriction information) to and from the storage device 30, sending a series of frame data (e.g. representing text messages, graphics, images, etc.) to the display device 40, and receiving/outputting signals from/to the I/O device 50.

In particular, the controller 20 coordinates the aforementioned operations of the wireless transceiver 10, the storage device 30, the display device 40, and the I/O device 50 for performing the method for handling a non-integrity-protected reject message.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium which may include any combination of the following: a Subscriber Identity Module (SIM) or Universal SIM (USIM), a non-volatile memory (e.g., a FLASH memory or a Non-Volatile Random Access Memory (NVRAM)), a magnetic storage device (e.g., a hard disk or a magnetic tape), and an optical disc. A SIM/USIM may contain SIM/USIM application containing functions, file structures, and elementary files, and it may be technically realized in the form of a physical card or in the form of a programmable SIM (e.g., eSIM) that is embedded directly into the UE 110. The storage device 30 may be used for storing data, including UE identification information (e.g., the Globally Unique Temporary UE Identity (GUTI) and/or 5G-GUTI), UE location information (e.g., the Tracking Area Identity (TAI) and/or TAI list), security information (e.g., the Key Set Identifier for E-UTRAN (eKSI) and/or Key Set Identifier for Next Generation Radio Access Network (ngKSI)), the list of equivalent PLMNs, and instructions and/or program code of applications, communication protocols, and/or the method for handling a non-integrity-protected reject message.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

It should be understood that the components described in the embodiment of FIG. 2 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications. Alternatively, the UE 110 may include fewer components. For example, the UE 110 may not include the display device 40 and/or the I/O device 50.

FIGS. 3A~3D show a flow chart illustrating the method for handling a non-integrity-protected reject message according to an embodiment of the application.

In this embodiment, the method for handling a non-integrity-protected reject message is executed by a UE (e.g., the UE 110) which is communicatively connected to a 5GCN (e.g., the 5GCN 150) over a 3GPP access (e.g., the 3GPP access 120) and a non-3GPP access (e.g., the non-3GPP access 130).

To begin with, the UE receives, from the 5GCN, a reject message without integrity protection (step S301).

Specifically, the reject message may be a REGISTRATION REJECT message or a SERVICE REJECT message in compliance with the 3GPP Technical Specification (TS) 24.501, and the reject message may include a reject cause indicative of illegal UE, illegal Mobile Equipment (ME), or 3GPP services not allowed.

The reject cause may refer to the 5GMM cause with a value of #3, #6, or #7, wherein #3 indicates "Illegal UE", #6 indicates "Illegal ME", and #7 indicates "5GS services not allowed" according to the 3GPP TS 24.501.

Subsequent to step S301, the UE determines whether the reject message is received over the 3GPP access or the non-3GPP access (step S302).

Subsequent to step S302, if the reject message is received over the 3GPP access, the UE determines whether it is already registered with the 5GCN over the non-3GPP access (step S303).

Subsequent to step S303, if the UE is not registered with the 5GCN over the non-3GPP access, the UE performs actions related to the reject cause included in the reject message. The actions include setting the 5GS update status to "5U3 ROAMING NOT ALLOWED", deleting the 5G-GUTI, the last visited registered TAI, the TAI list, and the ngKSI for 3GPP access (step S304), deleting the list of equivalent PLMNs if any (step S305), and incrementing the counter for "SIM/USIM considered invalid for GPRS services" events (step S306).

Please note that the actions related to the reject cause may include steps other than steps S304~S306, but the detailed description is omitted herein as it is beyond the scope of the application. Regarding the detailed description of the actions related to the reject cause, reference may be made to the 3GPP TS 24.501.

Subsequent to step S303, if the UE is already registered with the 5GCN over the non-3GPP access, the UE ignores the reject message (step S307).

Specifically, ignoring the reject message may refer to that the UE refrains from performing actions related to the reject cause. That is, by ignoring the reject message, the UE does not perform steps S304~S306.

Subsequent to step S307, the UE stores the current TAI in the list of "5GS forbidden tracking areas for roaming", memorizes the current TAI was stored in the list of "5GS forbidden tracking areas for roaming" for non-integrity protected NAS reject message, and enters the state 5GMM-DEREGISTERED.LIMITED-SERVICE (step S308).

Subsequent to step S308, the UE determines whether it is in an idle mode or a connected mode (step S309).

Specifically, the idle mode and the connected mode may refer to the 5GMM-IDLE mode and the 5GMM-CONNECTED mode, respectively, in compliance with the 3GPP TS 24.501.

Subsequent to step S309, if the UE is in an idle mode, the UE performs a registration update or a service request procedure with the 5GCN over the non-3GPP access (step S310).

Subsequent to step S310, the UE searches for a suitable cell in another tracking area (step S311).

Subsequent to step S309, if the UE is in a connected mode, the method proceeds to step S311.

Subsequent to step S311, the UE determines whether a suitable cell in another tracking area is found in the search (step S312).

Subsequent to step S312, if no suitable cell in another tracking area is found in the search, the UE resends the request message corresponding to the reject message on the same cell to the 5GCN (step S313), and the UE disables the N1 mode for the 3GPP access when the resent request message remains rejected (step S314).

Specifically, the request message may be a REGISTRATION REQUEST message if the reject message is a REGISTRATION REJECT message, or may be a SERVICE REQUEST message if the reject message is a SERVICE REJECT message.

In one embodiment, step S313 may be performed for a number of times if the resent request message remains rejected, and step S314 may be performed when the resent request message remains rejected for the number of times.

Subsequent to step S302, if the reject message is received over the non-3GPP access, the UE determines whether it is already registered with the 5GCN over the 3GPP access (step S315).

Subsequent to step S315, if the UE is not registered with the 5GCN over the 3GPP access, the UE performs actions related to the reject cause included in the reject message. The actions include setting the 5GS update status to "5U3 ROAMING NOT ALLOWED", deleting the 5G-GUTI, the last visited registered TAI, the TAI list, and the ngKSI for non-3GPP access (step S316), and incrementing the counter for "SIM/USIM considered invalid for 5GS services over non-3GPP access" events (step S317).

Please note that the actions related to the reject cause may include steps other than steps S316~S317, but the detailed description is omitted herein as it is beyond the scope of the application. Regarding the detailed description of the actions related to the reject cause, reference may be made to the 3GPP TS 24.501.

Subsequent to step S315, if the UE is already registered with the 5GCN over the 3GPP access, the UE ignores the reject message (step S318).

Specifically, ignoring the reject message may refer to that the UE refrains from performing actions related to the reject cause. That is, by ignoring the reject message, the UE does not perform steps S316~S317.

Subsequent to step S318, the UE searches for another suitable AP (step S319), and determines whether another suitable AP is found in the search (step S320).

Subsequent to step S320, if another suitable AP is found in the search (i.e., another suitable AP is available), the UE performs a registration attempt with the 5GCN over the non-3GPP access (step S321).

Subsequent to step S320, if no other suitable AP is found in the search, the UE resends the request message corresponding to the reject message on the same AP to the 5GCN (step S322), and disables the N1 mode for the non-3GPP access when the resent request message remains rejected (step S323).

In one embodiment, step S322 may be performed for a number of times if the resent request message remains rejected, and step S323 may be performed when the resent request message remains rejected for the number of times.

Subsequent to steps S306, S312 ("Yes" branch), S314, S317, S321, and S323, the method ends.

In addition to the scenario where the UE receives a non-integrity-protected reject message from a 5GS over one access (e.g., 3GPP access) while it's registered with the 5GS over another access (e.g., non-3GPP access), the method for handling a non-integrity-protected reject message may also be applied to other scenarios, such as the scenario where the UE receives a non-integrity-protected reject message from a 5GS over one access while it's registered with an EPS over one access, and the scenario where the UE receives a non-integrity-protected reject message from an EPS over one access while it's registered with a 5GS over one access. The latter two scenarios will be further described in FIGS. 4-5.

FIGS. 4A-4D show a flow chart illustrating the method for handling a non-integrity-protected reject message according to another embodiment of the application.

In this embodiment, the method for handling a non-integrity-protected reject message is executed by a UE (e.g., the UE 110) which is communicatively connected to a 5GCN (e.g., the 5GCN 150) over one access (e.g., the 3GPP access 120 or the non-3GPP access 130) and an EPC (e.g., the EPC 140) over one access (e.g., the 3GPP access 120 or the non-3GPP access 130).

To begin with, the UE receives, from the EPC, a reject message without integrity protection after sending a request message to the EPC over a 3GPP access or a non-3GPP access (step S401).

Specifically, the request message and the reject message may be an ATTACH REQUEST message and an ATTACH REJECT message, respectively, or may be a TRACKING AREA UPDATE REQUEST message and a TRACKING AREA UPDATE REJECT message, respectively, or may be a SERVICE REQUEST message and a SERVICE REJECT message, respectively, in compliance with the 3GPP TS 24.301; and the reject message may include a reject cause indicative of illegal UE, illegal ME, or 3GPP services not allowed.

The reject cause may refer to the EMM cause with a value of #3, #6, or #7, wherein #3 indicates "Illegal UE", #6 indicates "Illegal ME", and #7 indicates "EPS services not allowed" according to the 3GPP TS 24.301.

Subsequent to step S401, the UE determines whether the reject message is received over the 3GPP access or the non-3GPP access (step S402).

Subsequent to step S402, if the reject message is received over the 3GPP access, the UE determines whether it is registered with the 5GCN over the 3GPP access or the non-3GPP access (step S403).

Subsequent to step S403, if the UE is not registered with the 5GCN over the 3GPP access or the non-3GPP access, the UE performs actions related to the reject cause included in the reject message. The actions include setting the EPS update status to "EU3 ROAMING NOT ALLOWED", deleting any GUTI, the last visited registered TAI, the TAI list, and the eKSI for the access that the reject message is received over (step S404), deleting the list of equivalent PLMNs (step S405), and incrementing the counter for "SIM/USIM considered invalid for GPRS services" events (step S406).

Please note that the actions related to the reject cause may include steps other than steps S404~S406, but the detailed description is omitted herein as it is beyond the scope of the application. Regarding the detailed description of the actions related to the reject cause, reference may be made to the 3GPP TS 24.301.

Subsequent to step S403, if the UE is registered with the 5GCN over the 3GPP access or the non-3GPP access, the UE ignores the reject message (step S407).

Specifically, ignoring the reject message may refer to that the UE refrains from performing actions related to the reject cause. That is, by ignoring the reject message, the UE does not perform steps S404~S406.

Subsequent to step S407, the UE stores the current TAI in the list of "EPS forbidden tracking areas for roaming", memorizes the current TAI was stored in the list of "EPS forbidden tracking areas for roaming" for non-integrity protected NAS reject message, and enters the state EMM-DEREGISTERED.LIMITED-SERVICE (step S408).

Subsequent to step S408, the UE determines whether it is in an idle mode or a connected mode (step S409).

Specifically, the idle mode and the connected mode may refer to the RRC_IDLE mode and the RRC_CONNECTED mode, respectively.

Subsequent to step S409, if the UE is in an idle mode, the UE performs a registration update or a service request procedure with the 5GCN over the non-3GPP access (step S410).

Subsequent to step S410, the UE searches for a suitable cell in another tracking area (step S411).

Subsequent to step S409, if the UE is in a connected mode, the method proceeds to step S411.

Subsequent to step S411, the UE determines whether a suitable cell in another tracking area is found in the search (step S412).

Subsequent to step S412, if no suitable cell in another tracking area is found in the search, the UE resends the request message on the same cell to the EPC (step S413), and the UE disables the S1 mode for the 3GPP access when the resent request message remains rejected (step S414).

In one embodiment, step S413 may be performed for a number of times if the resent request message remains rejected, and step S414 may be performed when the resent request message remains rejected for the number of times.

Subsequent to step S402, if the reject message is received over the non-3GPP access, the UE determines whether it is registered with the 5GCN over the 3GPP access or the non-3GPP access (step S415).

Subsequent to step S415, if the UE is not registered with the 5GCN over the 3GPP access or the non-3GPP access, the UE performs actions related to the reject cause included in the reject message. The actions include setting the EPS update status to "EU3 ROAMING NOT ALLOWED", deleting any GUTI, the last visited registered TAI, the TAI list, and the eKSI for non-3GPP access (step S416), and incrementing the counter for "SIM/USIM considered invalid for GPRS services over non-3GPP access" events (step S417).

Please note that the actions related to the reject cause may include steps other than steps S416~S417, but the detailed description is omitted herein as it is beyond the scope of the application. Regarding the detailed description of the actions related to the reject cause, reference may be made to the 3GPP TS 24.301.

Subsequent to step S415, if the UE is registered with the 5GCN over the 3GPP access or the non-3GPP access, the UE ignores the reject message (step S418).

Specifically, ignoring the reject message may refer to that the UE refrains from performing actions related to the reject cause. That is, by ignoring the reject message, the UE does not perform steps S416~S417.

Subsequent to step S418, the UE searches for another suitable AP (step S419), and determines whether another suitable AP is found in the search (step S420).

Subsequent to step S420, if another suitable AP is found in the search (i.e., another suitable AP is available), the UE performs a registration attempt with the EPC over the non-3GPP access (step S421).

Subsequent to step S420, if no other suitable AP is found in the search, the UE resends the request message on the same AP to the EPC (step S422), and disables the S1 mode for the non-3GPP access when the resent request message remains rejected (step S423).

In one embodiment, step S422 may be performed for a number of times if the resent request message remains rejected, and step S423 may be performed when the resent request message remains rejected for the number of times.

Subsequent to steps S406, S412 ("Yes" branch), S414, S417, S421, and S423, the method ends.

FIGS. 5A~5D show a flow chart illustrating the method for handling a non-integrity-protected reject message according to another embodiment of the application.

In this embodiment, the method for handling a non-integrity-protected reject message is executed by a UE (e.g., the UE 110) which is communicatively connected to a 5GCN (e.g., the 5GCN 150) over one access (e.g., the 3GPP access 120 or the non-3GPP access 130) and an EPC (e.g., the EPC 140) over one access (e.g., the 3GPP access 120 or the non-3GPP access 130).

To begin with, the UE receives, from the 5GCN, a reject message without integrity protection after sending a request message to the 5GCN over a 3GPP access or a non-3GPP access (step S501).

Specifically, the request message and the reject message may be a REGISTRATION REQUEST message and a REGISTRATION REJECT message, respectively, or may be a SERVICE REQUEST message and a SERVICE REJECT message, respectively, in compliance with the 3GPP TS 24.501; and the reject message may include a reject cause indicative of illegal UE, illegal ME, or 3GPP services not allowed.

The reject cause may refer to the 5GMM cause with a value of #3, #6, or #7, wherein #3 indicates "Illegal UE", #6 indicates "Illegal ME", and #7 indicates "5GS services not allowed" according to the 3GPP TS 24.501.

Subsequent to step S501, the UE determines whether the reject message is received over the 3GPP access or the non-3GPP access (step S502).

Subsequent to step S502, if the reject message is received over the 3GPP access, the UE determines whether it is registered with the EPC over the 3GPP access or the non-3GPP access (step S503).

Subsequent to step S503, if the UE is not registered with the EPC over the 3GPP access or the non-3GPP access, the UE performs actions related to the reject cause included in the reject message. The actions include setting the 5GS update status to "5U3 ROAMING NOT ALLOWED", deleting the 5G-GUTI, the last visited registered TAI, the TAI list, and the ngKSI for the access that the reject message is received over (step S504), deleting the list of equivalent PLMNs if any (step S505), and incrementing the counter for "SIM/USIM considered invalid for GPRS services" events (step S506).

Please note that the actions related to the reject cause may include steps other than steps S504~S506, but the detailed description is omitted herein as it is beyond the scope of the application. Regarding the detailed description of the actions related to the reject cause, reference may be made to the 3GPP TS 24.501.

Subsequent to step S503, if the UE is registered with the EPC over the 3GPP access or the non-3GPP access, the UE ignores the reject message (step S507).

Specifically, ignoring the reject message may refer to that the UE refrains from performing actions related to the reject cause. That is, by ignoring the reject message, the UE does not perform steps S504~S506.

Subsequent to step S507, the UE stores the current TAI in the list of "5GS forbidden tracking areas for roaming", memorizes the current TAI was stored in the list of "5GS forbidden tracking areas for roaming" for non-integrity protected NAS reject message, and enters the state 5GMM-DEREGISTERED.LIMITED-SERVICE (step S508).

Subsequent to step S508, the UE determines whether it is in an idle mode or a connected mode (step S509).

Specifically, the idle mode and the connected mode may refer to the 5GMM-IDLE mode and the 5GMM-CONNECTED mode, respectively, in compliance with the 3GPP TS 24.501.

Subsequent to step S509, if the UE is in an idle mode, the UE performs a registration update or a service request procedure with the EPC over the 3GPP access or the non-3GPP access (step S510).

Subsequent to step S510, the UE searches for a suitable cell in another tracking area (step S511).

Subsequent to step S509, if the UE is in a connected mode, the method proceeds to step S511.

Subsequent to step S511, the UE determines whether a suitable cell in another tracking area is found in the search (step S512).

Subsequent to step S512, if no suitable cell in another tracking area is found in the search, the UE resends the request message on the same cell to the 5GCN (step S513), and the UE disables the N1 mode for the 3GPP access when the resent request message remains rejected (step S514).

In one embodiment, step S513 may be performed for a number of times if the resent request message remains rejected, and step S514 may be performed when the resent request message remains rejected for the number of times.

Subsequent to step S502, if the reject message is received over the non-3GPP access, the UE determines whether it is registered with the EPC over the 3GPP access or the non-3GPP access (step S515).

Subsequent to step S515, if the UE is not registered with the EPC over the 3GPP access or the non-3GPP access, the UE performs actions related to the reject cause included in the reject message. The actions include setting the 5GS update status to "5U3 ROAMING NOT ALLOWED", deleting the 5G-GUTI, the last visited registered TAI, the TAI list, and the ngKSI for non-3GPP access (step S516), and incrementing the counter for "SIM/USIM considered invalid for GPRS services over non-3GPP access" events (step S517).

Please note that the actions related to the reject cause may include steps other than steps S516~S517, but the detailed description is omitted herein as it is beyond the scope of the application. Regarding the detailed description of the actions related to the reject cause, reference may be made to the 3GPP TS 24.501.

Subsequent to step S515, if the UE is registered with the EPC over the 3GPP access or the non-3GPP access, the UE ignores the reject message (step S518).

Specifically, ignoring the reject message may refer to that the UE refrains from performing actions related to the reject cause. That is, by ignoring the reject message, the UE does not perform steps S516~S517.

Subsequent to step S518, the UE searches for another suitable AP (step S519), and determines whether another suitable AP is found in the search (step S520).

Subsequent to step S520, if another suitable AP is found in the search (i.e., another suitable AP is available), the UE performs a registration attempt with the 5GCN over the non-3GPP access (step S521).

Subsequent to step S520, if no other suitable AP is found in the search, the UE resends the request message on the same AP to the 5GCN (step S522), and disables the N1 mode for the non-3GPP access when the resent request message remains rejected (step S523).

In one embodiment, step S522 may be performed for a number of times if the resent request message remains rejected, and step S523 may be performed when the resent request message remains rejected for the number of times.

Subsequent to steps S506, S512 ("Yes" branch), S514, S517, S521, and S523, the method ends.

In view of the forgoing embodiments, it will be appreciated that the present application realizes robust UE operations on the reception of a non-integrity-protected reject message over one access while the UE is successfully registered with the same or different 3GPP core network over the same or another access. Advantageously, the UEs may be capable of handling the non-integrity-protected reject messages in all scenarios and potential cyberattacks may be avoided. For example, when a UE is already registered in a 5GS over one access and performs a registration attempt with the 5GS over another access, an attacker may hijack the registration request message and reply to the UE with a non-integrity-protected reject message which may include a reject cause value #3, #6, or #7. In conventional practices, the UE may respond to the non-integrity-protected reject message by performing actions related to the reject cause, which may stop the UE from obtaining normal services. By contrast, in the present application, the UE may ignore the non-integrity-protected reject message and remain registered with the 5GS to obtain normal services.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising:
a wireless transceiver, configured to perform wireless transmission and reception to obtain one or both of a 3rd Generation Partnership Project (3GPP) access and a non-3GPP access; and
a controller, configured to communicate with one or both of a first 3GPP core network and a second 3GPP core network over one or both of the 3GPP access and the non-3GPP access via the wireless transceiver, wherein the communication with one or both of the first 3GPP core network and the second 3GPP core network comprises:
receiving, from the first 3GPP core network, a reject message without integrity protection; and
searching for another suitable cell or another suitable Access Point (AP), when the reject message is received over the 3GPP access or the non-3GPP access and the UE is registered with the first 3GPP core network or the second 3GPP core network over the 3GPP access or the non-3GPP access.

2. The UE of claim 1, wherein the reject message is received from the first 3GPP core network over the non-3GPP access, and the UE is registered with the first 3GPP core network or the second 3GPP core network over the 3GPP access, and the communication with one or both of the first 3GPP core network and the second 3GPP core network further comprises:
performing a registration attempt with the first 3GPP core network over the non-3GPP access, when another suitable AP for the non-3GPP access is searched.

3. The UE of claim 1, wherein the reject message comprises a reject cause indicative of illegal UE, illegal Mobile Equipment (ME), or 3GPP services not allowed, and the communication with one or both of the first 3GPP core network and the second 3GPP core network further comprises:
ignoring the reject message, when the reject message is received over the 3GPP access or the non-3GPP access and the UE is registered with the first 3GPP core network or the second 3GPP core network over the 3GPP access or the non-3GPP access.

4. The UE of claim 3, wherein the ignoring of the reject message comprises:
refraining from performing actions related to the reject cause.

5. The UE of claim 4, wherein the actions related to the reject cause comprise the following when the first 3GPP core network is a 5G Core network (5GCN):
setting a 5GS update status to "5U3 ROAMING NOT ALLOWED";
deleting a 5G Globally Unique Temporary UE Identity (GUTI), a last visited registered Tracking Area Identity (TAI), a TAI list, and a Key Set Identifier for Next Generation Radio Access Network (ngKSI); and
incrementing a counter for "SIM/USIM considered invalid for GPRS services" events.

6. The UE of claim 4, wherein the actions related to reject cause comprise the following when the first 3GPP core network is an Evolved Packet Core (EPC):
setting an EPS update status to "EU3 ROAMING NOT ALLOWED";
deleting a Globally Unique Temporary UE Identity (GUTI), a last visited registered Tracking Area Identity (TAI), a TAI list, and a Key Set Identifier for Evolved Universal Terrestrial Access Network (eKSI); and
incrementing a counter for "SIM/USIM considered invalid for GPRS services" events.

7. The UE of claim 1, wherein the communication with one or both of the first 3GPP core network and the second 3GPP core network further comprises:
camping on a cell or AP and sending a request message corresponding to the reject message on the cell or AP to the first 3GPP core network, prior to receiving the reject message;
resending the request message on the cell or AP to the first 3GPP core network, when the searching for another suitable cell or suitable AP fails; and
disabling an N1 mode or an S1 mode when the resent request message remains rejected.

8. The UE of claim 1, wherein the communication with one or both of the first 3GPP core network and the second 3GPP core network further comprises:
when the UE is registered with the first 3GPP core network or the second 3GPP core network over the 3GPP access or the non-3GPP access and the UE is in an IDLE mode, performing a registration update or a service request procedure with the first 3GPP core network or the second 3GPP core network that the UE is registered with.

9. The UE of claim 1, wherein the reject message is a REGISTRATION REJECT message or a SERVICE REJECT message when the first 3GPP core network is a 5GCN.

10. The UE of claim 1, wherein the reject message is an ATTACH REJECT message, a TRACKING AREA UPDATE REJECT message, or a SERVICE REJECT message when the first 3GPP core network is an EPC.

11. A method for handling a non-integrity-protected reject message, executed by a UE communicatively connected to one or both of a first 3rd Generation Partnership Project (3GPP) core network and a second 3GPP core network over one or both of a 3GPP access and a non-3GPP access, the method comprising:
receiving, from the first 3GPP core network, a reject message without integrity protection; and
searching for another suitable cell or another suitable Access Point (AP), when the reject message is received over the 3GPP access or the non-3GPP access and the UE is registered with the first 3GPP core network or the second 3GPP core network over the 3GPP access or the non-3GPP access.

12. The method of claim 11, wherein the reject message is received from the first 3GPP core network over the non-3GPP access, and the UE is registered with the first 3GPP core network or the second 3GPP core network over the 3GPP access, and the method further comprises:
performing a registration attempt with the first 3GPP core network over the non-3GPP access, when another suitable AP for the non-3GPP access is searched.

13. The method of claim 11, wherein the reject message comprises a reject cause indicative of illegal UE, illegal Mobile Equipment (ME), or 3GPP services not allowed, and the method further comprises:
ignoring the reject message, when the reject message is received over the 3GPP access or the non-3GPP access and the UE is registered with the first 3GPP core network or the second 3GPP core network over the 3GPP access or the non-3GPP access.

14. The method of claim 13, wherein the ignoring of the reject message comprises:
refraining from performing actions related to the reject cause.

15. The method of claim 14, wherein the actions related to the reject cause comprise the following when the first 3GPP core network is a 5G Core network (5GCN):
setting a 5GS update status to "5U3 ROAMING NOT ALLOWED";
deleting a 5G Globally Unique Temporary UE Identity (GUTI), a last visited registered Tracking Area Identity (TAI), a TAI list, and a Key Set Identifier for Next Generation Radio Access Network (ngKSI); and
incrementing a counter for "SIM/USIM considered invalid for GPRS services" events.

16. The method of claim 14, wherein the actions related to the reject cause comprise the following when the first 3GPP core network is an Evolved Packet Core (EPC):
setting an EPS update status to "EU3 ROAMING NOT ALLOWED";
deleting a Globally Unique Temporary UE Identity (GUTI), a last visited registered Tracking Area Identity (TAI), a TAI list, and a Key Set Identifier for Evolved Universal Terrestrial Access Network (eKSI); and
incrementing a counter for "SIM/USIM considered invalid for GPRS services" events.

17. The method of claim 11, further comprising:
camping on a cell or and AP and sending a request message corresponding to the reject message on the cell or AP to the first 3GPP core network, prior to receiving the reject message;
resending the request message on the cell or AP to the first 3GPP core network, when the searching for another suitable cell or suitable AP fails; and
disabling an N1 mode or an S1 mode when the resent request message remains rejected.

18. The method of claim 11, further comprising:
when the UE is registered with the first 3GPP core network or the second 3GPP core network over the 3GPP access or the non-3GPP access and the UE is in an IDLE mode, performing a registration update or a service request procedure with the first 3GPP core network or the second 3GPP core network that the UE is registered with.

19. The method of claim 11, wherein the reject message is a REGISTRATION REJECT message or a SERVICE REJECT message when the first 3GPP core network is a 5GCN.

20. The method of claim 11, wherein the reject message is an ATTACH REJECT message, a TRACKING AREA UPDATE REJECT message, or a SERVICE REJECT message when the first 3GPP core network is an EPC.

* * * * *